June 11, 1957 M. GEISZLER 2,795,060
LAND LEVELER
Filed June 19, 1953
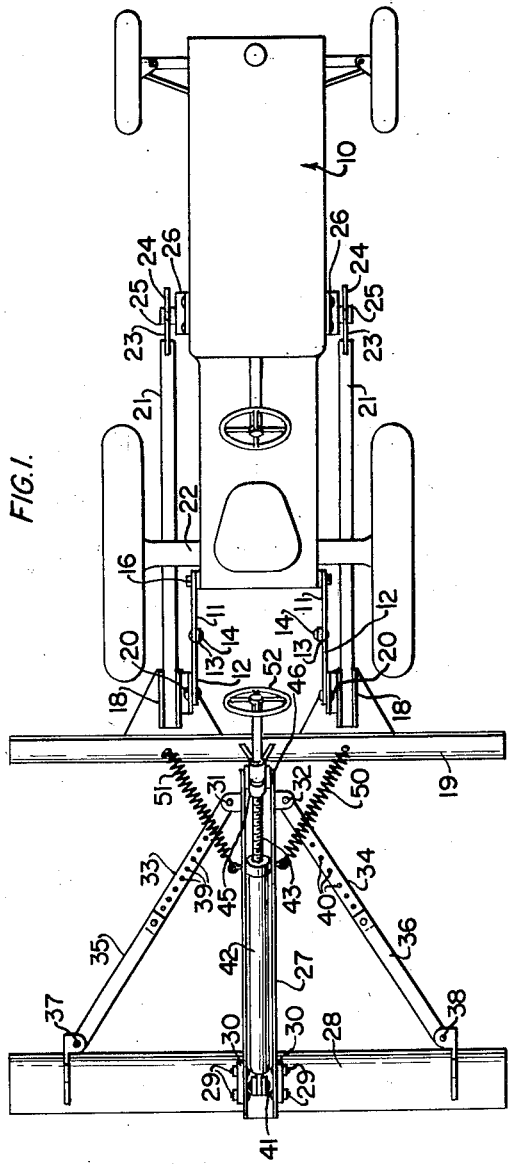
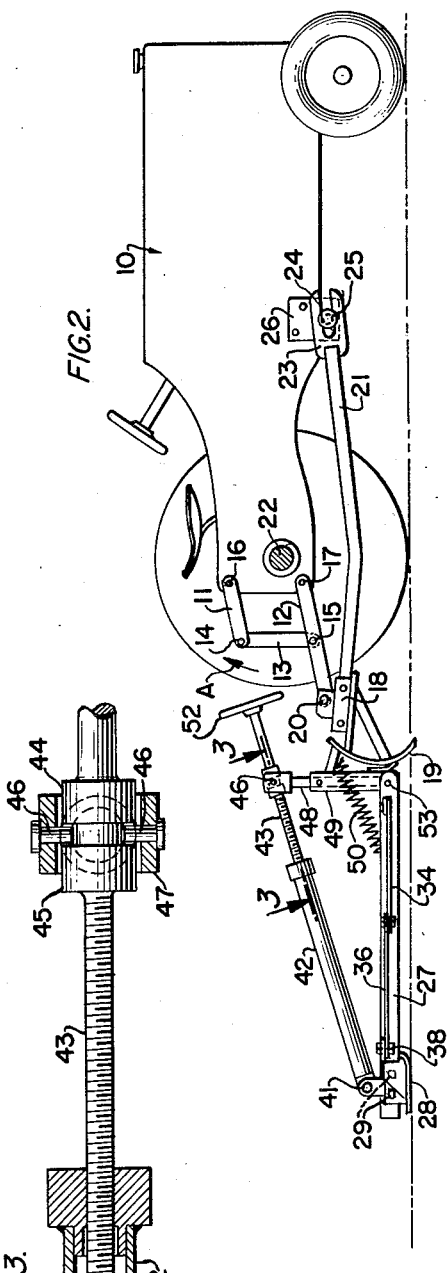
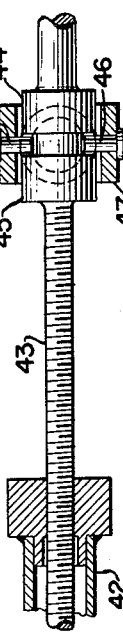
MARTIN GEISZLER,
INVENTOR.
BY George Douglas Jones.
ATTORNEY.

United States Patent Office 2,795,060
Patented June 11, 1957

2,795,060

LAND LEVELER

Martin Geiszler, Bell, Calif.

Application June 19, 1953, Serial No. 362,781

3 Claims. (Cl. 37—153)

This invention relates to a land leveler and more particularly to a land leveler for use in connection with tractors.

It is an object of the present invention to provide a very efficient leveler which may be operated in closely coupled relationship with a tractor.

Another object of the invention is to provide a very compact and closely coupled arrangement of the leveler blade, relative to the tractor drawing the same, wherein the blade is effectively stablized by arm members extending a considerable distance forwardly thereof and connected with the tractor.

Another object of the invention is to provide a leveler having a blade closely coupled to a tractor and whereby a ground engaging member drawn rearwardly of the blade serves as a controlling element for regulating the scraping depth of the blade with relation to the surface of the ground.

Another object of the invention is to provide a tractor drawn land leveler having a closely coupled blade and a following ground engaging member which is pivoted to the blade and provided with a simple means for pivotally adjusting the ground engaging member vertically, relative to the blade, whereby the operator of the tractor may readily set the blade at the desired scraping depth by means of the ground engaging member.

Another object of the invention is to provide a tractor drawn land leveler which may be readily and easily transported in connection with the tractor.

Another object of the invention is to provide a land leveler which may be readily and easily lifted by means of a conventional elevating tractor hitch or by any other simple arrangement such as a hydraulic cylinder, or the like.

Another object of the invention is to provide a tractor drawn land leveler having a closely coupled blade and a ground engaging skid which may be replaced by wheels for supporting the leveler above the surface of the ground during transportation thereof in connection with the tractor.

A further object of the invention is to provide a tractor drawn land leveler having a closely coupled blade and ground engaging members which may be drawn behind the blade at a considerable distance therefrom during rough leveling operations and which may be arranged in close proximity to the blade during the finishing of leveling operations.

Other objects of the invention will be apparent from the following specification and claims when read in view of the accompanying drawings in which:

Fig. 1 of the drawing is a top or plan view of a tractor showing the land leveler, according to the present invention, in connection therewith.

Fig. 2 is a side elevational view of a tractor showing the rear axle thereof in section and one wheel removed and having the land leveler, according to the present invention, arranged in connection therewith; and, Fig. 3 is an enlarged fragmentary sectional view of the structure taken from the line 3—3 of Fig. 2 of the drawing.

The tractor 10 shown in Figs. 1 and 2 of the drawings is a conventional tractor having conventional upper and lower elevating hitch links 11 and 12, these links are arranged to pivot upwardly in the direction of the arrow A in Fig. 2 of the drawing in a manner conventional to such hitches which are normally employed to draw and elevate various implements. The rear ends of the links 11 are pivoted to downwardly extending links 13 by means of pins 14. The lower ends of the links 13 are pivoted to the links 12 by means of pins 15. The forward ends of the links 11 and 12 are attached to the tractor by conventional elements 16 and 17, respectively. The rear ends of the links 12 are pivotally connected to brackets 18 fixed to blade 19. Pivotal connection of the links 12 to the brackets 18 is made by pins 20.

Fixed to the brackets 18 are arms 21 which extend forwardly of the rear axle 22 of the tractor. The forward ends of the arms 21 are provided with plates 23 having slots 24 in which projecting lugs or shafts 25 are engaged. These lugs or shafts 25 are fixed to the tractor 10 by means of mounting plates 26 and their axes are substantially horizontally disposed.

The pivotal connections of the arms 21, provided by the lugs or shafts 25, are located a considerable distance forwardly of the blade 19 to provide stable support thereof when drawn by the hitch links 12. The location of the lugs or shafts 25 may vary with respect to the tractor forwardly of the rear axle 22. For the most stable arrangement of these arms 21 the lugs or shafts 25 might be mounted near the front end of the tractor or forwardly thereof, as desired. Such forward mounting may necessitate installation of forwardly extending frame members.

Pivotally connected to the rear of the blade 19 by means of the substantially horizontal pin 53 is the ground engaging skid draw bar 27. A ground engaging skid 28 is secured to the draw bar 27 by means of bolts 29. The bolts 29 may be readily removed so that brackets 30 of the ground engaging skid may be moved forwardly along the draw bar 27 to a location in close proximity to the blade 19. In such location the ground engaging skid 28 may be connected by bolts 29 in a similar manner to that shown in the rearmost connected position illustrated in the drawing.

Pins 31 and 32 provide pivotal connections for the angular braces 33 and 34 which are adjustably connected to aligned braces 35 and 36 which are pivotally connected by means of pins 37 and 38 to the ground engaging skid 28.

The braces 33 and 34 are provided with a plurality of bolt receiving holes 39 and 40 adapted to permit shortening of the angular braces when the ground engaging skid 28 is moved forwardly into position in closer proximity to the blade 19.

The pin 41, shown best in Fig. 2 of the drawings, provides a pivotal connection on the rearward portion of the draw bar 27 for the screw-jack cylinder 42.

Screw-threadably connected with the interior of the cylinder 42 is the screw 43 which is provided with rotating collars 44 and 45 which are arranged in opposed relation to each other and engageable with pins 46 in the yoke 47 supported on a post 48. The post 48 is preferably vertically adjustably mounted in a cylindrical member 49 fixed to the blade 19, as shown best in Fig. 2 of the drawings.

Springs 50 and 51 interconnect the draw bar 27 and upper portions of the blade 19 and tend to raise the draw bar 27 together with the ground engaging skid 28 and maintain alignment of the same with the tractor 10.

Fixed to the end of the screw 43 is a hand wheel 52 arranged to provide for manual operation of the screw 43.

It will here be noted that the jack cylinder 42 and screw 43 may be replaced by any suitable acutator or adjusting device such as a hydraulic cylinder, or the like, It will also be understood that the blade 19 together with the arms 21 may be raised by a suitable actuator such as a hydraulic cylinder, if desired. Such a hydraulic cylinder installation could be arranged to replace the lifting elements of the conventional elevating hitch mechanism provided by the conventional links 11 and 12. As for example, a hydraulic cylinder may be connected with a structure of the tractor and the arms 21 for retracting the same upwardly.

The operation of the hereinbefore described land leveler is substantially as follows:

When the land leveler in connection with the tractor, as shown in Fig. 2 of the drawings, is employed to level rough surfaced ground, the ground engaging skid 28 is located at its rearmost position on the bar 27 and when it is desired to operate on relatively even ground, the ground engaging skid 28 may be located on the bar 27 in closer proximity to the blade 19. Such a location in close proximity to the blade 19 is desirable for finishing operations during the final leveling of a plot of ground.

The arms 21 in their slidable, pivotal connection with the lugs or shafts 25 permit the blade 19 to move upwardly relative to the tractor about the axis of the pivot element 17 on the tractor 10. It will be readily understood that the forward ends of the arms 21 might be pinned at the axis of the lugs or shafts 25 and that the brackets 18 might be slotted to permit slidable movement of the pins 20 therein. A slotted arrangement of this kind permitting movement of the pins 20 would be substantially an equivalent arrangement to the slotted portions 24 of the plates 23 at the forward ends of the arms 21.

When it is desired to adjust the scraping depth of the blade 19, the hand wheel 52 may be rotated for advancing or retracting the screw 43 with respect to the screw-jack cylinder 42. Adjustment performed by operation of the hand wheel 52 permits the screw-jack to be extended or shortened between the pins 41 and 46. The pins 46 are stationarily located with respect to the blade 19 while the pin 41 is adapted to pivot about the axis of the pin 53 which forms the pivotal connection on the bar 27 with the blade 19.

It will therefor be understood that the extension of the screw-jack between the pins 41 and 46 will cause downward pivotal movement of the bar 27, forcing the ground engaging skid 28 downwardly and moving the blade 19 upwardly thereto. Retraction of the screw-jack causes the opposite effect by pivoting the ground engaging skid 28 upwardly about the axis of the pin 53 which permits the blade 19 to operate at a deeper scraping level.

As hereinbefore described, the ground engaging skid 28, when in its rearward position, as shown in Fig. 2 of the drawings, is arranged to operate most efficiently on rough, uneven ground and when such rough, uneven ground has been substantially leveled, the ground engaging skid 28 may be moved forwardly to a position in closer proximity to the blade 19 by means of the bracket 30 and bolts 29, as hereinbefore described. The angular braces 35 and 36 may be shortened, as hereinbefore described, to correspond with the forward location of the ground engaging skid 28. When the ground engaging skid 28 is located in closer proximity to the blade 19 than the position shown in the drawings, it is adapted to provide for finishing leveling operations.

It will be obvious that the bar 27 may be pivotally adjusted with respect to the blade 19 about the axis of the pin 53 by various actuators such as hydraulic cylinders, or other suitable means. The springs 50 and 51 tend to assist the screw-jack in retracting the bar 27 and ground engaging skid 28 upwardly about the axis of the pin 53 forming the pivotal connection of the ground engaging skid with the blade 19.

For purpose of transporting the land leveler in connection with the tractor, as shown in Fig. 2 of the drawings, wheels may be connected to the ground engaging skid 28 in order to support the same in rolling relationship above the surface of the ground. In such transportable condition the blade 19 is also maintained above the ground level by a proper adjustment of the screw-jack composed of the cylinder 42 and the screw 43.

When it is desired to elevate the land leveler by means of the conventional elevating hitches 11 and 12 of the tractor 10, the conventional power means associated therewith is energized which shifts the level upwardly, in a conventional manner, normal to implements drawn by such elevating hitches.

It will be obvious to those skilled in the art that a hydraulic cylinder, or other equivalent actuator, may be connected to the tractor frame and the arms 21 for pivoting the same upwardly about the axis of the lugs or shafts 25 to provide an alternate means for elevating with respect to the surface of the ground for the purpose of transporting the same in connection with the tractor.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

I claim:

1. In a land leveler, a tractor having a rear axle, a blade, arms fixed thereto and pivoted to said tractor on a substantially horizontal axis located forwardly of the said axle, a bar pivoted to said blade and extending rearwardly therefrom and a ground engaging skid connected to said bar, means for pivotally adjusting said bar relative to said blade whereby said ground engaging skid provides means for regulating the scraping depth of said blade, means connected with said bar for adjusting the spaced relationship of said ground engaging skid with said blade.

2. In a land leveler, a tractor having a rear axle, a blade, arms fixed thereto and pivoted to said tractor on a substantially horizontal axis located forwardly of the said axle, a bar pivoted to said blade and extending rearwardly therefrom and a ground engaging skid connected to said bar, means for pivotally adjusting said bar relative to said blade whereby said ground engaging skid provides means for regulating the scraping depth of said blade, means connected with said bar for adjusting the spaced relationship of said ground engaging skid with said blade, brace means interconnecting said bar and said ground engaging skid.

3. In a land leveler, a tractor having a rear axle, a blade, arms fixed thereto and pivoted to said tractor on a substantially horizontal axis located forwardly of the said axle, a bar pivoted to said blade and extending rearwardly therefrom and a ground engaging skid connected to said bar, means for pivotally adjusting said bar relative to said blade whereby said ground engaging skid provides means for regulating the scraping depth of said blade, means connected with said bar for adjusting the spaced relationship of said ground engaging skid with said blade, brace means interconnecting said bar and said ground engaging skid, said brace means being longitudinally adjustable.

References Cited in the file of this patent
UNITED STATES PATENTS

| Number | Name | Date |
| --- | --- | --- |
| 1,315,150 | Paul | Sept. 2, 1919 |
| 2,217,449 | Nabors | Oct. 8, 1940 |
| 2,257,596 | Davenport | Sept. 30, 1941 |
| 2,398,147 | McKay | Apr. 9, 1946 |
| 2,428,857 | Smith | Oct. 14, 1947 |
| 2,440,550 | Martin | Apr. 27, 1948 |
| 2,463,169 | Grewe | Mar. 1, 1949 |
| 2,548,139 | Berry | Apr. 10, 1951 |
| 2,620,715 | Silver et al. | Dec. 9, 1952 |